United States Patent
Skelton

(10) Patent No.: US 9,415,700 B2
(45) Date of Patent: Aug. 16, 2016

(54) BATTERY THERMAL SYSTEM AND DIAGNOSTIC METHOD

(75) Inventor: Scott M. Skelton, Belleville, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 1017 days.

(21) Appl. No.: 13/602,411

(22) Filed: Sep. 4, 2012

(65) Prior Publication Data

US 2014/0067323 A1  Mar. 6, 2014

(51) Int. Cl.
| | |
|---|---|
| *H01M 10/48* | (2006.01) |
| *B60L 11/18* | (2006.01) |
| *B60L 11/12* | (2006.01) |
| *H01M 10/625* | (2014.01) |
| *H01M 10/633* | (2014.01) |
| *H01M 10/6568* | (2014.01) |
| *H01M 10/6565* | (2014.01) |

(52) U.S. Cl.
CPC .......... *B60L 11/1879* (2013.01); *B60L 11/126* (2013.01); *B60L 11/1874* (2013.01); *B60L 11/1875* (2013.01); *H01M 10/486* (2013.01); *H01M 10/625* (2015.04); *H01M 10/633* (2015.04); *B60L 2240/545* (2013.01); *H01M 10/6565* (2015.04); *H01M 10/6568* (2015.04); *Y02T 10/6217* (2013.01); *Y02T 10/705* (2013.01); *Y02T 10/7005* (2013.01); *Y02T 10/7077* (2013.01)

(58) Field of Classification Search
CPC ............ B60L 11/1879; B60L 11/1875; B60L 11/126; B60L 11/1874; B60L 2240/545; H01M 10/486; H01M 10/625; H01M 10/633; H01M 10/6568; H01M 10/6565; Y02T 10/705; Y02T 10/6217; Y02T 10/7077; Y02T 10/7005

See application file for complete search history.

(56) References Cited

U.S. PATENT DOCUMENTS

| | | | | |
|---|---|---|---|---|
| 6,394,210 | B2* | 5/2002 | Matsuda | B60H 1/00278 180/65.1 |
| 6,481,230 | B2* | 11/2002 | Kimishima | B60H 1/323 62/238.7 |
| 7,483,270 | B2* | 1/2009 | Blake | F04D 27/004 361/679.48 |
| 8,042,993 | B2 | 10/2011 | Van Maanen | |
| 8,298,692 | B2* | 10/2012 | Hermann | H01M 8/04089 180/65.1 |
| 8,679,659 | B2* | 3/2014 | Claypole | H01M 10/6569 429/50 |
| 8,816,645 | B2* | 8/2014 | Dickinson | H01M 2/1077 320/150 |
| 2007/0090810 | A1* | 4/2007 | Dickinson | H01M 2/1077 320/150 |

(Continued)

FOREIGN PATENT DOCUMENTS

| | | |
|---|---|---|
| CN | 1348074 A | 5/2002 |
| CN | 102439756 A | 5/2012 |

*Primary Examiner* — Naum B Levin
(74) *Attorney, Agent, or Firm* — Quinn Law Group, PLLC

(57) ABSTRACT

A system includes a battery pack having a fluid inlet, a fluid outlet, and battery cells. The system also includes a thermal system having heat transfer fluid, a flow device, an inlet thermocouple, one or more internal thermocouples connected to a respective one of the battery cells, and a controller. The controller receives and processes temperature signals from the thermocouples using a thermal model to diagnose performance of the flow device. The system may estimate values when an outlet thermocouple is not used. A method includes circulating the fluid through the battery pack, positioning an inlet thermocouple proximate to the fluid inlet, and connecting one or more internal thermocouples to respective battery cells. A controller receives and processes temperature signals from the inlet thermocouple and the internal thermocouple(s) to diagnose performance of the flow device using the thermal model.

16 Claims, 2 Drawing Sheets

(56) References Cited

U.S. PATENT DOCUMENTS

| | | | |
|---|---|---|---|
| 2008/0213652 A1* | 9/2008 | Scheucher | B60L 8/00 429/62 |
| 2009/0139781 A1* | 6/2009 | Straubel | B60L 11/1875 180/65.1 |
| 2011/0020676 A1* | 1/2011 | Kurosawa | B60K 1/04 429/62 |
| 2011/0091750 A1* | 4/2011 | Claypole | H01M 10/6569 429/50 |
| 2011/0229749 A1* | 9/2011 | Kim | H01M 10/486 429/120 |
| 2012/0297809 A1* | 11/2012 | Carpenter | B60L 1/003 62/244 |

* cited by examiner

BATTERY THERMAL SYSTEM AND DIAGNOSTIC METHOD

TECHNICAL FIELD

The present disclosure relates to a battery thermal system and an accompanying diagnostic method for the same.

BACKGROUND

Certain vehicles are propelled at least part of the time using electrical energy drawn from a high-voltage DC battery pack. The battery pack energizes one or more polyphase electric traction motors via a power inverter. Hybrid electric vehicles selectively use an internal combustion engine as a source of input torque to a transmission, alone or in conjunction with the traction motor(s). Extended-range electric vehicles use a smaller engine only when needed, and solely to power an electric generator. Battery electric vehicles forego use of a gas engine altogether, and instead operate using stored electrical energy or regenerative braking energy. All three vehicle configurations can operate at least part of the time solely via electricity in what is referred to as an electric vehicle (EV) mode.

In all of the above vehicle embodiments, the high-voltage DC battery pack is used to alternatively store and deliver the substantial amounts of electrical energy needed for driving the fraction motor(s). The battery pack may consist of multiple battery modules each containing multiple cylindrical or flat/tabular battery cells. Effectively dissipating heat generated by the battery cells in operation is essential to optimizing overall vehicle performance. As a result, battery thermal systems are used in conjunction with such battery packs to circulate a volume of a suitable heat transfer fluid through the battery pack and associated power electronics. The same thermal system can also be used to heat the battery pack as needed.

SUMMARY

A system is disclosed herein that includes a battery pack, a controller, and a flow device that circulates heat transfer fluid for regulating the temperature of the battery pack. The system includes a plurality of thermocouples or other temperature sensors. An inlet thermocouple is positioned at or near a fluid inlet of the battery pack. An optional outlet thermocouple may be positioned at or near a fluid outlet of the battery pack. The remaining thermocouples are all positioned within the battery pack itself, and thus are referred to hereinafter as internal thermocouples. Each internal thermocouple is connected to a respective one of the battery cells. Only one internal thermocouple may be used in a simple embodiment. However, multiple internal thermocouples are described in the various examples provided herein to provide an improved level of fidelity and more accurate diagnostic results.

The controller uses a recorded thermal model of the battery pack to diagnose the performance of the thermal system, e.g., the mechanical and/or electrical functionality of the flow device as well as the geometry and other qualities of the conduit loop, including any clogged ducts or conduit. At a calibrated interval, a processor receives temperature signals from the inlet and internal thermocouple(s), as well as the optional outlet thermocouple when this device is used.

A method includes circulating heat transfer fluid, via a flow device, through a battery pack having a plurality of battery cells, positioning an inlet thermocouple proximate to a fluid inlet of the battery pack, and connecting at least one internal thermocouple within the battery pack to a respective battery cell. The method also includes receiving and processing, via a controller, temperature signals from the inlet thermocouple and the at least one internal thermocouple to thereby diagnose performance of the flow device, including using a recorded thermal model of the battery pack.

Another system includes a processor in communication with a flow device that circulates heat transfer fluid from a fluid inlet to a fluid outlet of a battery pack to heat or cool the battery pack. The system also includes memory on which is recorded a thermal model of a battery pack and instructions for diagnosing the performance of the thermal system. The processor is configured to periodically execute the instructions to thereby cause the processor to receive and process temperature signals from the inlet and the internal thermocouple(s) and thus diagnose performance of the flow device.

The above features and advantages and other features and advantages of the present invention are readily apparent from the following detailed description of the best modes for carrying out the invention when taken in connection with the accompanying drawings.

DETAILED DESCRIPTION

Figure 1:
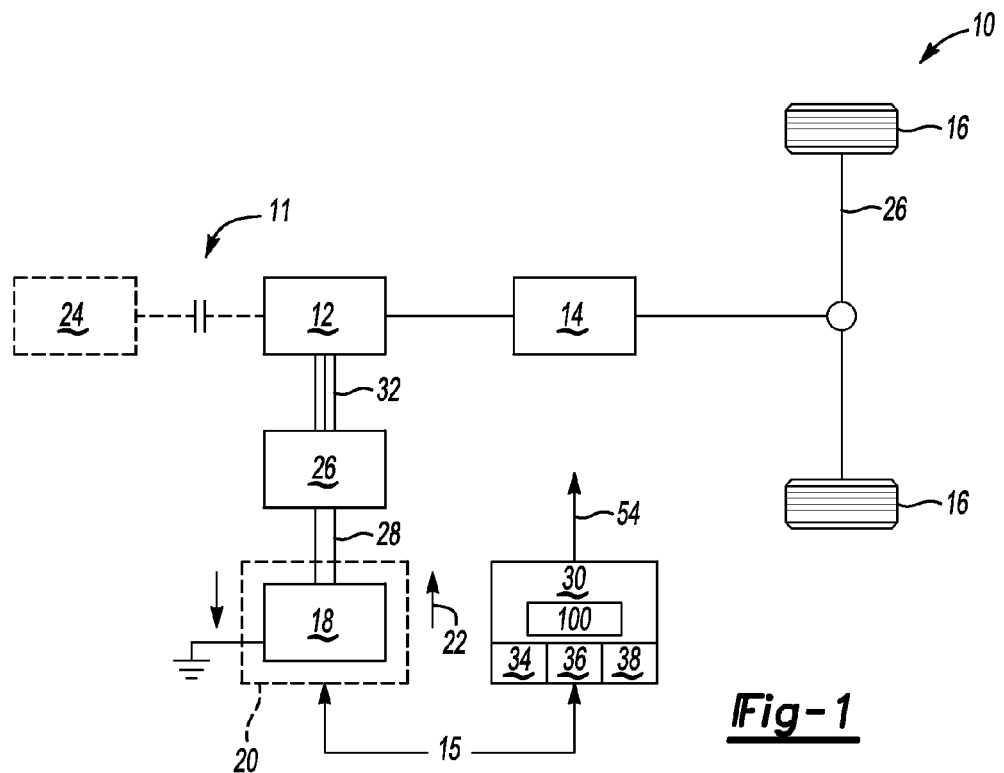
FIG. 1 is a schematic illustration of a vehicle having a high-voltage battery pack, a thermal system used to heat or cool the battery pack, and a controller which diagnoses the performance of the thermal system as set forth herein.
Figure 3:
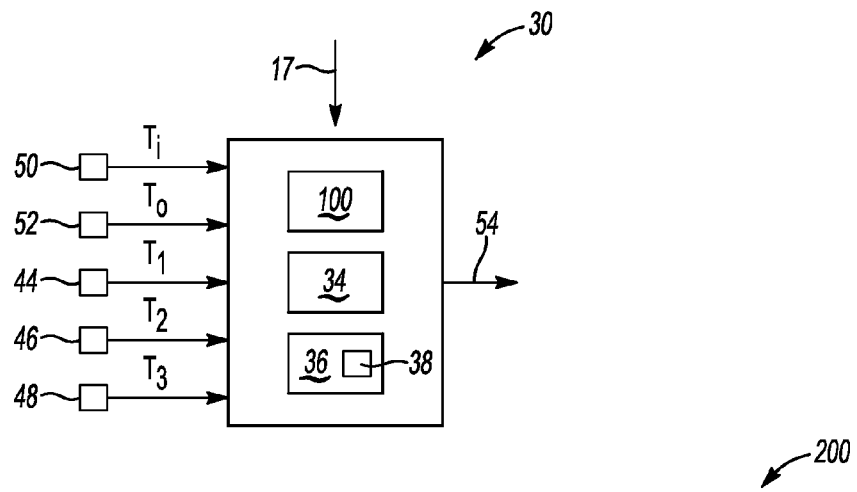
FIG. 3 is a schematic illustration of the controller shown in FIG. 1, along with a set of thermocouples used for execution of a diagnostic method for the thermal system shown in FIG. 2.
Figure 4:
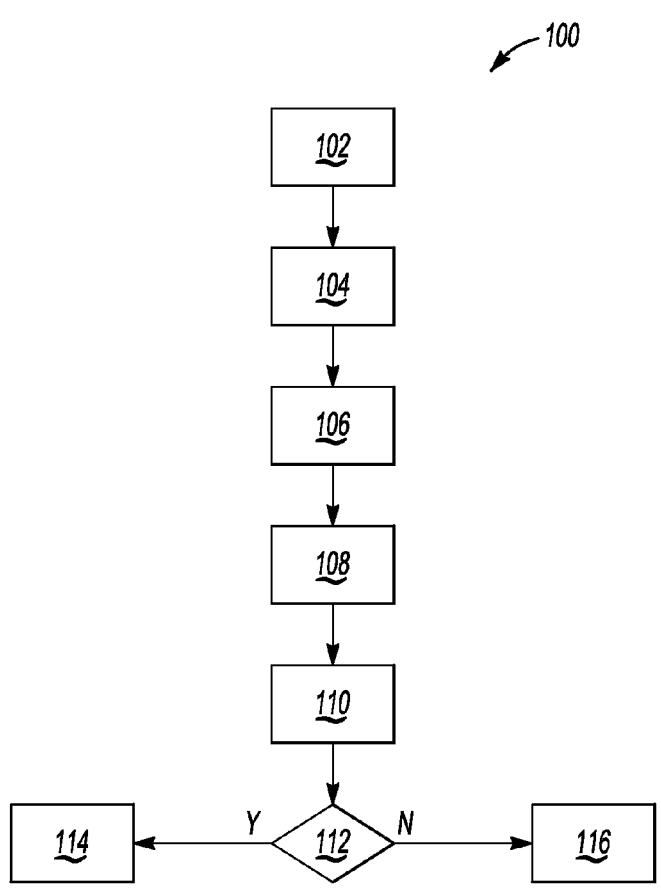
FIG. 4 is a flow chart describing an example method for diagnosing the thermal system shown in FIG. 1.
Figure 5:
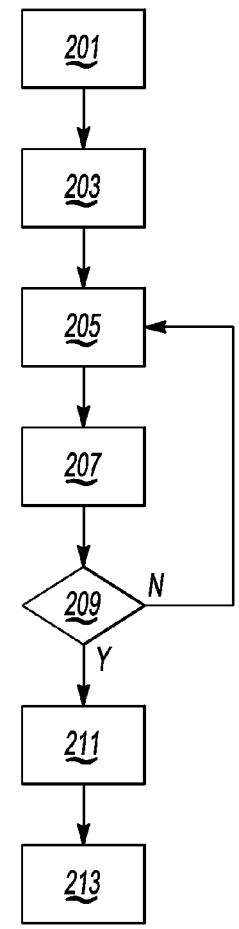
FIG. 5 is a flow chart describing an alternative method for diagnosing the thermal system shown in FIG. 1.

Referring to the drawings, wherein like reference numbers refer to like components throughout the several Figures, an example vehicle 10 is shown schematically in FIG. 1. The vehicle 10 includes a high-voltage electric traction motor 12, a transmission 14, and a set of drive wheels 16. The vehicle 10 also includes a rechargeable high-voltage battery pack 18 that is heated or cooled as needed via a thermal system 20, an example of which is described in greater detail below with reference to FIG. 2. As explained in detail below, a controller 30, an example of which is shown in FIG. 3, periodically diagnoses the performance of the thermal system 20. Two example embodiments of the diagnostic approach are shown in FIGS. 4 and 5 as methods 100 and 200, respectively.

Figure 2:
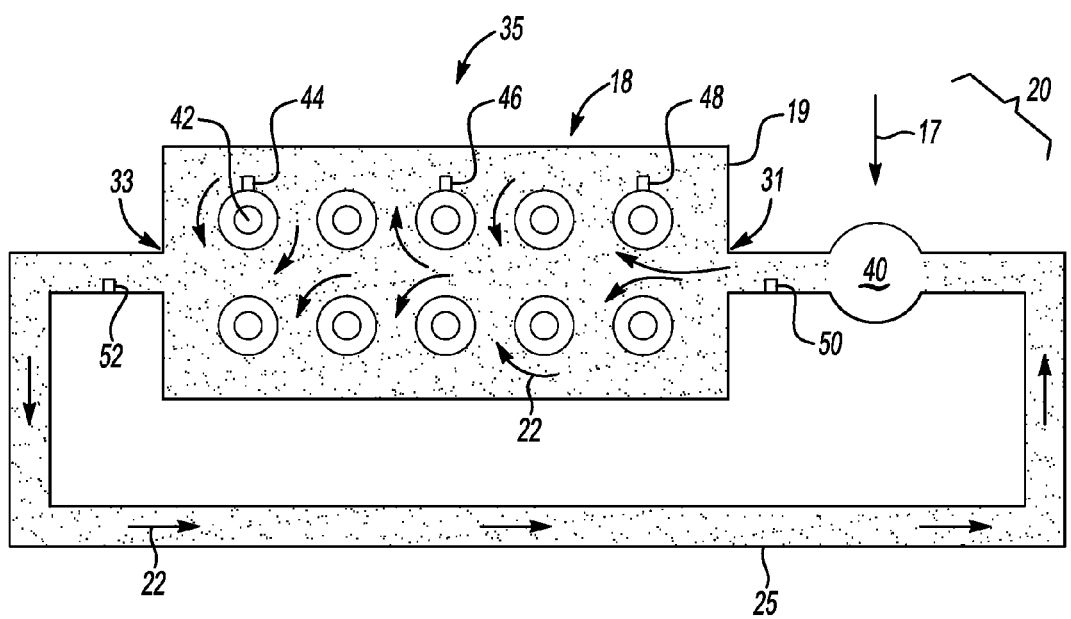
FIG. 2 is a schematic illustration of a portion of the thermal system and controller of FIG. 1.

The thermal system 20 of FIGS. 1 and 2 circulates a suitable heat transfer fluid (arrows 22) such as air or coolant through the battery pack 18 in order to dissipate heat generated by the battery pack 18 during its operation, or to heat the battery pack 18 as needed. While not shown in the Figures for added simplicity, the same thermal system 20 may be used to circulate the heat transfer fluid (arrows 22) through the various power electronics used to control the traction motor 12 of FIG. 1, e.g., a traction power inverter module (TPIM) 26, an auxiliary power module/DC-DC converter (not shown), etc.

Optionally, the vehicle 10 of FIG. 1 may include an internal combustion engine 24. The engine 24 may be connected to the traction motor 12 via an input damping clutch 11. The engine 24 can be used to power the traction motor 12 when needed, or the engine 24 may be alternatively connected to the transmission 14, e.g., in a hybrid vehicle embodiment, so as to deliver input torque directly to the transmission 14 in other vehicle embodiments. The configuration shown in FIG. 1 is only one possible embodiment for an extended-range electric vehicle. However, the thermal system 20, as well as the method 100 described below with reference to FIG. 4, may be used in conjunction with any battery pack 18, regardless of voltage level, and in any vehicle or non-vehicular configuration in which such a battery pack 18 may be employed.

The traction motor 12 of FIG. 1 draws electrical energy from and delivers electrical energy to the battery pack 18. The battery pack 18 thus forms a rechargeable energy storage system for energizing all high-voltage electrical components used aboard the vehicle 10. As used herein, the term "high voltage" refers to a voltage level in excess of any auxiliary/12 VDC voltage levels normally used to power auxiliary vehicle systems such as audio systems, lighting, and the like. The battery pack 18 may be rated for approximately 60 VDC to over 300 VDC depending on the power rating of the traction motor 12. Such voltage levels are likely to generate substantial heat during operation, and thus are well suited for use with the thermal system 20 shown in FIG. 2.

When the traction motor 12 of FIG. 1 is configured as a polyphase AC induction machine, the vehicle 10 may also include the TPIM 26, a device that is electrically connected to the battery pack 18 via a high-voltage DC bus 28. The TPIM 26 is also electrically connected to the traction motor 12 via a high-voltage AC bus 32. The TPIM 26 may be controlled via pulse-width modulation and high-speed semiconductor switching, as is well understood in the art, to enable the TPIM 26 to convert AC power from the traction motor 12 into DC power suitable for storage in the battery pack 18, and to convert the stored DC power back into AC power as needed for powering the traction motor 12.

With respect to the controller 30, this component executes instructions or code embodying the various steps of a method 100 (FIG. 4) or alternately a method 200 (FIG. 5 from a tangible, non-transitory memory device 36. Execution of the methods 100, 200 allows a processor 34 within the controller 30 to diagnose the performance of the thermal system 20 using a recorded thermal model 38 of the battery pack 18. The controller 30 may be configured as one or more digital computers each having, in addition to the processor 34 and the memory device 36, e.g., read only memory (ROM), flash memory, or other magnetic or optical storage media, any required amount of transitory memory such as random access memory (RAM) and electrically-erasable programmable read only memory (EEPROM). The controller 30 may also include a high-speed clock, analog-to-digital (A/D) and digital-to-analog (D/A) circuitry, and input/output circuitry and devices (I/O), as well as appropriate signal conditioning and buffer circuitry.

The controller 30 shown in FIG. 1 is in communication with the thermal system 20, e.g., over a communications bus or controller area network (CAN) bus 15 as shown. Therefore, the controller 30 is able to transmit any required output signals (arrow 54) in the execution of the methods 100 or 200, as well as to receive any required signals, including but not necessarily limited to the temperature signals $T_i$, $T_o$, and $T_1$-$T_3$ shown in FIG. 3. Output signals (arrow 54) may include a passing or failing diagnostic code as noted below with reference to FIG. 4.

Referring to FIG. 2, the processor 34 of FIG. 1 receives, or alternatively calculates or accesses from the memory device 36, any relevant input commands used to control the speed of a flow device 40, e.g., position data, and/or any other measured or derived values used to command a particular output speed from the flow device 40. The processor 34, in diagnosing the thermal system 20, may also process battery parameters such as battery state of charge (SOC), applied voltage, current, and/or a calculated power value. In response to the collective set of input commands, the flow device 40 circulates heat transfer fluid to the battery pack via the conduit loop to heat or cool the battery pack as needed.

The thermal system 20 of FIG. 2 includes the flow device 40, e.g., a fluid pump or an electric fan. The flow device 40 is in fluid communication with a housing 19 of the battery pack 18 via a conduit loop 25, for instance connected lengths of pipe, tubing, and/or hydraulic/pneumatic hose routed through the housing 19 of the battery pack 18 and past/around the battery cells 42 contained therein. All examples show herein describe a closed-loop system. However, in other embodiments the heat transfer fluid (arrows 22) may not circulate. The methods 100 and 200 may still be used in such an embodiment.

Heat transfer fluid 22 in the form of air, coolant, or a suitable refrigerant is circulated by the flow device 40 through the conduit loop 25. An output speed is commanded of the flow device 40 via transmission of input speed signals (arrow 17) from the controller 30 (see FIGS. 1 and 3), with the input speed signals (arrow 17) including such values as a commanded voltage, current, power level, or speed.

As part of the present control approach, a thermocouple 50 is positioned at a fluid inlet 31 to the battery pack 18 and is configured to measure the actual inlet temperature of the heat transfer fluid 22 entering the battery pack 18. An optional thermocouple 52 is positioned at or near a fluid outlet 33 of the battery pack 18. The thermocouple 52 measures the outlet temperature of the heat transfer fluid 22 exiting the battery pack 18. The fluid inlet and outlet 31, 33 respectively define the entry and exits orifices of the conduit loop 25 into and out of the battery pack 18 for the fluid 22 circulated via the flow device 40. Therefore, the thermocouples 50 and 52 are referred to hereinafter as the inlet and outlet thermocouples, respectively, for added clarity. As will be apparent to one having ordinary skill in the art, the terms "inlet" and "outlet" as used herein depend upon the direction of flow of the heat transfer fluid 22 through the battery pack 18, and thus the actual fluid inlet and outlet could be the reverse of that shown in FIG. 2.

Additionally, at least one additional thermocouple is positioned inside of the battery pack 18, with each additional thermocouple used therein being connected to a respective one of the battery cells 42. Thus, each of the additional thermocouples, which are referred to hereinafter as internal thermocouples for added clarity, measures the temperature of a particular battery cell 42 and not the heat transfer fluid 22 flowing within the battery pack 18. The battery cells 42 may be embodied as, for example, nickel metal hydride (NiMH) battery cells, lithium-ion battery cells, or any other rechargeable battery cell. While shown as a plurality of cylindrical battery cells in the example embodiment of FIG. 2, the battery cells 42 may be flat, substantially rectangular tabular electrode extensions that are ultrasonically welded to a conductive interconnecting member (not shown) of the battery pack 18. In all embodiments, regardless of the shape/size of the battery cells 42, heating or cooling of the battery pack 18 is achieved via circulation of the heat transfer fluid 22.

In a simplified approach, a single internal thermocouple 44 may be positioned inside of the battery pack 18. In the higher-fidelity embodiment shown in FIG. 2, a plurality of internal thermocouples 44, 46, and 48 are positioned inside of the battery pack 18, with the internal thermocouple 44 being positioned nearest the fluid outlet 33, the internal thermocouple 46 being positioned nearest the center 35 of the battery pack 18, and the internal thermocouple 48 being positioned nearest the fluid inlet 31 as shown. Additional internal thermocouples may be used on other battery cells 42 within the battery pack 18 to improve the overall fidelity of the diagnostic measurements described below. The number of thermocouples used may be equal to the number of battery cells 42, although the cost of doing this may exceed the incremental improvement in diagnostic results. Therefore, a smaller number of thermocouples, e.g., three or four, may provide optimal coverage.

The controller 30 shown in FIG. 1 receives measured temperature values from the various thermocouples 50, 52, 44, 46, and 48 shown in FIG. 2, and then processes the measured values to determine a temperature gradient within the battery pack 18. Rather than treating the entirety of the battery pack 18 as a single bulk thermal mass in the conventional manner, the method 100 instead includes the estimation of the changing temperature of the heat transfer fluid 22 of FIG. 2 as it flows past or between the different battery cells 42 within the battery pack 18. That is, the controller 30 uses the processor 34 to estimate the temperature of the heat transfer fluid 22, via the recorded thermal model 38, as a function of the measured temperatures of the battery cells 42, as well as the geometry and physical composition of the battery pack 18, and the mass flow rate of the heat transfer fluid 22.

Referring briefly to FIG. 3, the controller 30 is shown schematically in communication with the inlet thermocouple 50, the optional outlet thermocouple 52, and the internal thermocouples 44, 46, and 48. Additionally, the controller 30 calculates, receives, or otherwise has access to the values of the input speed signals (arrow 17) used to control the flow device 40 shown in FIG. 2. The inlet thermocouple 50 transmits an inlet temperature signal, $T_i$, while the outlet thermocouple 52, when used, transmits an outlet temperature signal, $T_o$. Likewise, the internal thermocouples 44, 46, and 48 transmit temperature respective signals $T_1$, $T_2$, and $T_3$ to controller 30. These values are used in conjunction with the thermal model 38 to diagnose the performance of the thermal system 20.

Referring to FIG. 4, the method 100, which begins at step 102, is executed on a periodic basis, for instance continuously during any active key cycle of the vehicle 10 of FIG. 1. When the outlet thermocouple 52 is not available, or is not used, method 200 of FIG. 5 is executed.

The controller 30 of FIG. 3 determines information related to the operation of the flow device 40 shown in FIG. 2. Specifically, the controller 30 measures or reads the input speed commands (arrow 17) to the flow device 40 and calculates the commanded speed of the flow device 40 using these values. Alternatively, the changing rotational position of a fan blade, vane, or other fan or pump element may be detected, e.g., using a position sensor (not shown) that is mounted with respect to the rotating element, with the encoded position data used by the controller 30 to calculate the rotational speed.

As part of step 102, the controller 30 ultimately uses the input speed values (arrow 17 of FIG. 3) to calculate the mass flow rate of the heat transfer fluid 22 that is discharged by the flow device 40 through the conduit loop 25 shown in FIG. 2, and then records the calculated mass flow rate in the memory device 36. As is well understood in the art, the correlation between mass flow rate and the rotational speed of a given flow device, e.g., the flow device 40 of FIG. 2, is available through manufacturer's data, calculation, or through testing.

At step 104, the controller 30 next obtains the inlet temperature ($T_i$) into the battery pack 18 by receiving and recording the temperature measured by the inlet thermocouple 50 shown in FIG. 2. The method 100 then proceeds to step 106.

At step 106, the controller 30 obtains the battery cell temperatures of one or more of the battery cells 42 within the battery pack 18 shown in FIG. 3, i.e., of any battery cell 42 having a connected thermocouple. In the embodiment of FIG. 2, execution of step 106 entails receipt by the processor 34 of three different temperature values, i.e., temperatures $T_1$, $T_2$, and $T_3$, all of which are shown schematically in FIG. 3. The method 100 then proceeds to step 108.

At step 108, the controller 30 of FIG. 3 next estimates and records the temperature of the heat transfer fluid 22 at various points within the battery pack 18. For example, when three thermocouples 44, 46, and 48 are used on three different battery cells 42 as shown in FIG. 2, with the battery cells 42 being located in proximity to the respective fluid inlet 31, the center 35, and the fluid outlet 33 of the battery pack 18, the controller 30 estimates the temperature of the heat transfer fluid 22 immediately downstream of the battery cell 42 nearest the fluid inlet 31 as a function of the mass flow rate, the measured inlet temperature ($T_i$) into the battery pack 18, and the measured temperature ($T_i$) of the battery cell 42 nearest the fluid inlet 31.

Then, using the battery thermal model 38 shown in FIG. 3, the controller 30 determines the distance between the battery cell 42 near the fluid inlet 31 and the next battery cell 42 having an attached thermocouple, e.g., the battery cell 42 at the center 35 of the battery pack 18 as shown in FIG. 2. The controller 30 also knows the temperature of the battery cell 42 at the center 35 via signals from the internal thermocouple 46 of FIGS. 2 and 3, i.e., temperature $T_2$. Using these values, the controller 30 estimates the temperature of the heat transfer fluid 22 immediately downstream of the battery cell 42 at the center 35. The same process is then repeated for the next battery cell 42 having a connected thermocouple, e.g., a battery cell 42 nearest the fluid outlet 33 of FIG. 2, with the estimated temperature of the heat transfer fluid 22 just downstream of this final battery cell 42, e.g., at the outlet 33, being recorded in the memory device 36.

A formula that may be used as part of step 108 is as follows:

$$T_{22,out,n} = T_{22,in,n+1} = T_{22,in,n} + hA(T_{42,n} - T_{22,in,n})$$

where $T_{22,out,n}$ is the temperature of the heat transfer fluid 22 as it passes or exits a battery cell 42(n), $T_{22,in,n-1}$ is the temperature of the heat transfer fluid 22 as it enters/approaches the next (n+1) battery cell 42, $T_{18,n}$ is the temperature of the n$^{th}$ cell of the battery pack 18, and hA is a calibrated value. The value of hA can be determined as a function of the measured temperature, thermodynamic properties, and mass flow rate of the heat transfer fluid 22, as well as the geometric properties of the system, e.g., the sizes/spacing between the various battery cells 42 shown in FIG. 2.

At step 110, the controller 30 measures the actual temperature of the heat transfer fluid 22 at the fluid outlet 33 of the battery pack 18 shown in FIG. 2 via the outlet thermocouple 52. This value is the outlet temperature ($T_o$). The method 100 then proceeds to step 112.

At step 112, the controller 30 of FIG. 2 compares the estimated temperature at the fluid outlet 33 (see FIG. 2) from step 108 to the value recorded in step 110. If the estimated values are within a calibrated range of one another, the controller 30 proceeds to step 114. Otherwise, the controller 30 proceeds to step 116.

At step 114, the controller 30 may record a diagnostic code having a passing status in the memory device 36. Once the code is recorded, or any other suitable control action is executed for the passing diagnostic, the method 100 is finished until the subsequent sample period, such as the next key cycle.

At step 116, the controller records a diagnostic code having a failing status in the memory device 36. As part of step 116, additional maintenance may be performed, such as repair or replacement of the flow device 40 of FIG. 2 and/or of any or all of the thermocouples 50, 52, 44, 46, and/or 48, repair of conduit/ductwork of the conduit loop 25, removal of debris, etc.

As noted above, method 100 relies on the use of the outlet thermocouple 52 and direct measurement of the outlet temperature of the coolant (arrow 22) exiting the battery pack 18. In some instances, however, the outlet thermocouple 52 may not be available. An alternative approach is possible by predicting the temperature of the battery pack 18 and comparing the predicted temperature with a measured temperature. One possible approach for this situation is execution of the method 200.

Referring to FIG. 5, the alternative method 200 noted above begins at step 201, wherein the controller 30 of FIG. 1 measures a set of initial conditions, including the temperatures of the battery pack 18 at each of the battery cells 42 used therein that have an attached thermocouple 44. The method 200 proceeds to step 203 when this step is complete.

At step 203, the controller 30 next measures periodic conditions over a calibrated time step (t), including for instance the inlet temperature (Ti) shown in FIG. 3, the various temperatures of the battery pack 18, e.g., $T_1$-$T_3$ of FIG. 3, and the electrical current and voltage delivered to the battery pack 18. The method 200 then proceeds to step 205.

At step 205, the controller 30 estimates the temperature of the battery cells 42. Step 205 includes recording a number of temperatures (n) within the battery pack 18 for the time step (t), where n is equal to the number of thermocouples 44 used within the battery pack 18. So, in the example of FIG. 2, n=3. As part of step 205, the controller 30 may use the following formula:

$$T_{42,n,t} = \frac{(I^2 R - [\dot{m}c_p]_{22}(hA)(T_{22,in,n} - T_{42,n,t}))dt}{(mc_p)42} + T_{42,n,t-1}$$

where $\dot{m}c_p$ is the mass flow rate and specific heat of the heat transfer fluid 22, respectively, and $(mc_p)_{42}$ represents the respective mass (m) and specific heat $(c_p)$ of the battery cells 42, which may comprise less than the total number of battery cells 42 used in a given battery pack 18, e.g., when multiple modules of battery cells 42 are used to build a battery pack 18. Step 205 uses a predetermined set of battery parameters, in this example the current (I) and internal resistance (R).

At step 207, the controller 30 next calculates the temperature of the heat transfer fluid (arrow 22) for the time step (t). The temperature of the fluid (arrow 22) is defined as the estimated outlet temperature of one of the (n) battery cells 42 and the inlet to the next battery cell 42, i.e., the battery cell 42 (n+1). The following equation may be used as part of this step:

$$T_{22,out,n} = T_{22,in,n+1} = T_{22,in,n} + hA(T_{42,n} - T_{22,in,n}).$$

At step 209, the controller 30 determines if steps 205 and 207 have been completed for all of the battery cells 42 having an attached thermocouple 44. If so, the method 200 continues with step 211. Otherwise, steps 205 and 207 are repeated with n incrementing from 1 to the number of battery cells 42 having an attached internal thermocouple 44.

At step 211, the controller 30 next measures and averages all battery temperatures for all (n) battery cells 42 having attached internal thermocouples 44 to calculate a measured bulk battery temperature $(T_B)$ for the battery pack 18 as a whole. The controller 30 also averages all battery temperature predictions for all (n) battery cells 42 from step 205 to calculate an estimated bulk battery temperature. Step 211 may be conducted using various averaging techniques, included for example weighted averaging or straight averaging. The method 200 proceeds to step 213 once the measured bulk battery temperature $(T_B)$ has been recorded.

At step 213, the controller 30 compares the measured bulk temperature $(T_B)$ to the estimated bulk battery temperature from step 211. If the difference is less than a calibrated value, the controller 30 may record a diagnostic code having a passing status. Likewise, if the difference exceeds the calibrated value, the controller 30 may record a diagnostic code having a failing status.

Using the methods 100 and 200 as described above, the controller 30 can be used to diagnose the thermal system 20 of FIG. 1 using the recorded battery thermal model 38. The thermal model 38 may be discretized, i.e., divided into as many pieces as there are internal thermocouples used in the battery pack 18, to improve diagnostic accuracy relative to conventional methods. Knowledge of the functioning state of the thermal system 20 may be required for several reasons, including onboard diagnostics (OBD) compliance, remedial action, and hardware protection.

While the best modes for carrying out the invention have been described in detail, those familiar with the art to which this invention relates will recognize various alternative designs and embodiments for practicing the invention within the scope of the appended claims.

The invention claimed is:

1. A system comprising:
    a battery pack having a fluid inlet, a fluid outlet, and a plurality of battery cells;
    a flow device that circulates heat transfer fluid through the battery pack;
    a conduit loop that conducts the heat transfer fluid from the flow device to the fluid inlet of the battery pack, and from the fluid outlet of the battery pack to the flow device, to thereby heat or cool the battery pack;
    an inlet thermocouple that is positioned proximate to the fluid inlet of the battery pack;
    at least one internal thermocouple positioned within the battery pack that is connected to and configured to measure a temperature of a respective one of the battery cells; and
    a controller having a processor and tangible, non-transitory memory on which is recorded a thermal model of the battery pack and instructions for diagnosing performance of the flow device;
    wherein the controller, via the processor, periodically executes the instructions to receive and process inlet temperature and battery cell temperature signals from the inlet thermocouple and the at least one internal thermocouple, respectively, using the thermal model, including estimating a temperature of the heat transfer fluid between the battery cells as a function of the measured temperatures of the respective battery cells, a geometry and physical composition of the battery pack, and a mass flow rate of the heat transfer fluid, to thereby diagnose the performance of the flow device, and wherein diagnosing the performance of the flow device includes recording, in memory of the controller, a diagnostic code having a passing or failing status.

2. The system of claim 1, further comprising an outlet thermocouple positioned proximate to the fluid outlet of the battery pack, wherein the processor also receives and processes temperature signals from the outlet thermocouple, using the thermal model, to thereby diagnose the performance of the flow device.

3. The system of claim 1, wherein the at least one internal thermocouple includes a plurality of internal thermocouples each connected to a different one of the battery cells.

4. The system of claim 3, wherein the plurality of internal thermocouples includes a first thermocouple positioned proximate to the fluid inlet, a second thermocouple positioned proximate to the center of the battery pack, and a third thermocouple positioned proximate to the fluid outlet.

5. The system of claim 1, further comprising an outlet thermocouple positioned at the fluid outlet, wherein the controller diagnoses the performance of the thermal system in part by:
   calculating the mass flow rate of the heat transfer fluid;
   estimating an outlet temperature of the heat transfer fluid from the battery pack using the thermal model and the calculated mass flow rate of the heat transfer fluid;
   measuring an outlet temperature using the outlet thermocouple;
   comparing the estimated outlet temperature to the measured outlet temperature;
   recording the diagnostic code having the passing status when the values of the estimated and measured outlet temperatures are within a calibrated range of one another, and recording the diagnostic code having the failing status when the values of the estimated and measured outlet temperatures are not within a calibrated range of one another.

6. The system of claim 1, wherein the controller is configured to:
   estimate the temperatures of the battery cells as a function of:
      the mass flow rate, thermodynamic properties, and measured temperature of the heat transfer fluid;
      a predetermined set of battery parameters;
      the temperatures, specific heat, and masses of the battery cells and a set of geometric properties of the system;
   average the estimated temperatures of the battery cells to thereby calculate an estimated bulk battery temperature for the battery pack as a whole;
   average the measured temperatures of the battery cells from the at least one internal thermocouple to thereby calculate a measured bulk battery temperature for the battery pack as a whole;
   compare the estimated bulk battery temperature to the measured bulk battery temperature; and
   record the diagnostic code recording the diagnostic code having the passing status when the values of the estimated and measured bulk battery temperatures are within a calibrated range of one another, and recording the diagnostic code having the failing status when the values of the estimated and measured bulk battery temperatures are not within a calibrated range of one another.

7. The system of claim 1, further comprising a motor/generator unit that is electrically connected to the battery pack.

8. The system of claim 7, further comprising a transmission, wherein the motor/generator unit is a vehicle traction motor that is coupled to a member of the transmission.

9. A method comprising:
   circulating heat transfer fluid, via a flow device, through a battery pack having a plurality of battery cells;
   positioning an inlet thermocouple proximate to a fluid inlet of the battery pack;
   connecting at least one internal thermocouple within the battery pack to a respective battery cell; and
   receiving and processing, via a controller, temperature signals from the inlet thermocouple and the at least one internal thermocouple to thereby diagnose performance of the flow device, including using a recorded thermal model of the battery pack to estimate a temperature of the heat transfer fluid between the battery cells as a function of the measured temperatures of the respective battery cells, a geometry and physical composition of the battery pack, and a mass flow rate of the heat transfer fluid, wherein diagnosing the performance of the flow device includes recording, in memory of the controller, a diagnostic code having a passing or failing status.

10. The method of claim 9, further comprising:
    positioning an outlet thermocouple positioned proximate to a fluid outlet of the battery pack; and
    receiving and processing, via the controller, temperature signals from the outlet thermocouple.

11. The method of claim 10, further comprising:
    calculating the mass flow rate of the heat transfer fluid;
    estimating an outlet temperature of the heat transfer fluid from the battery pack using the thermal model and the calculated mass flow rate of the heat transfer fluid;
    measuring an outlet temperature of the heat transfer from the battery pack using the outlet thermocouple;
    comparing the estimated outlet temperature to the measured outlet temperature; and
    recording the diagnostic code with a failing status when the values of the estimated outlet temperature and the measured outlet temperature are not within a calibrated range of one another.

12. The method of claim 11, further comprising connecting the battery pack to a traction motor of a vehicle, wherein the flow device is a fluid pump or a fan of the vehicle.

13. The method of claim 9, wherein connecting at least one internal thermocouple includes connecting a plurality of internal thermocouples to different battery cells.

14. The method of claim 13, wherein the plurality of internal thermocouples includes a first thermocouple positioned proximate to the fluid inlet, a second thermocouple positioned proximate to the center of the battery pack, and a third thermocouple positioned proximate to the fluid outlet.

15. The method of claim 9, further comprising:
    determining a set of battery parameters, including at least one of a state of charge, an applied voltage, a current, and a power value of the battery pack; and
    estimating a temperature of each of the battery cells as a function of:
       the mass flow rate, thermodynamic properties, and measured temperature of the heat transfer fluid;
       the predetermined set of battery parameters;
       the temperatures, specific heat, and masses of the battery cells; and a set of geometric properties of the system.

16. The method of claim 15, further comprising:
    averaging the estimated temperatures of the battery cells to thereby calculate an estimated bulk battery temperature for the battery pack as a whole;
    averaging the measured temperatures of the battery cells from the at least one internal thermocouple to thereby calculate a bulk measured battery temperature for the battery pack as a whole;

comparing the estimated bulk battery temperature to the measured bulk battery temperature; and recording the diagnostic code having the passing status when the values of the estimated and measured bulk battery temperatures are within a calibrated range of one another, and recording the diagnostic code having the failing status when the values of the estimated and measured bulk battery temperatures are not within a calibrated range of one another.

* * * * *